United States Patent Office 2,894,901
Patented July 14, 1959

2,894,901

HYDROFORMING PROCESS AND CATALYSTS

George R. Gilbert, Elizabeth, and Isidor Kirshenbaum, Union, N.J., assignors to Esso Research and Engineering Company, a corporation of Delaware No Drawing. Application March 1, 1955
Serial No. 491,527

15 Claims. (Cl. 208—136)

The present invention relates to improvements in hydroforming bases or catalysts. More particularly, the present invention relates to hydroforming bases or catalysts containing titania derived from organic titanates, which bases and catalysts possess the properties of high activity and selectivity and heat stability.

Heretofore and prior to the present invention, many catalyst compositions have been proposed for use in the hydroforming of naphthas. It is known, of course, that hydroforming is an operation in which a naphtha, either virgin or cracked, or a mixture of the two, is contacted at elevated temperatures and pressures in the presence of added hydrogen with a solid catalytic material, whereby the naphtha feed is converted to a product of improved octane rating. Although hydrogen is added to the process, it is caried out so that there is no net consumption of hydrogen, and usually there is a net production. The chemical reactions involved in hydroforming are dehydrogenation of naphthenes to form the corresponding aromatics, cyclization of paraffins and dehydrogenation to form aromatics as where normal heptane is formed into toluene, isomerization of straight chain paraffins to form isoparaffins and some hydrocracking of the higher boiling material to lower boiling material whereby the volatility of the hydroformed product is improved. Hydroforming is now practiced in this country on a commercial scale. Among the catalysts used in these commercial operations is platinum carried on alumina and molybdenum oxide carried on alumina. These catalysts have good and desirable properties but lack other desired properties. For example, platinum is an excellent hydrogenation-dehydrogenation component of the catalyst, but its cracking activity is not as good as desired, and consequently, a small amount of halide or other cracking component is included in the catalyst composition to correct this insufficiency. Molybdenum oxide-containing catalysts as hydrogenation-dehydrogenation components are not as good as platinum, but on the other hand, they posses higher cracking activity. Furthermore, of course, they are much less expensive than platinum and more adaptable for regeneration with an oxygen-containing gas without injury to the catalyst. The molybdenum oxide-containing catalyst is also better adapted for use in hydroforming where the catalyst is in the form of a fluidized bed.

In brief compass, the present invention proposes a new class of catalyst characterized in that these catalysts possess high surface area, high thermal stability, good activity and superior selectivity to $C_5+$ gasoline constituents. These catalysts contain titania and are prepared from the organic titanates. It has been found that catalysts containing titania prepared from the organic titanates are superior to catalysts containing titania prepared by conventional methods and superior to catalysts containing only molybdenum oxide and alumina, all of which will appear more fully and at large hereinafter.

The object of the invention is to prepare a new class of catalyst adapted to promote and catalyze the hydroforming of napthas, which catalyst is characterized by high surface area, high thermal stability and improved activity and selectivity. In preparing the new class of catalysts, the following procedure gives good results:

EXAMPLE I

A solution of 1200 grams of butyl titanate (containing the equivalent of 22 weight percent $TiO_2$) and 3360 cc. of an aluminum amylate solution (containing the equivalent of 100 grams of $Al_2O_3$ per liter) was added as a stream to 7200 cc. of distilled water at room temperature while stirring vigorously. Stirring was continued for 1 hour to make certain that hydrolysis was complete. The slurry was filtered and the precipitate was heated on a steam bath to evaporate most of the occluded volatiles. The material was calcined at 700° F. for 3 hours and then for an additional 3 hours at 1200° F. This base had a surface area of 245 square meters per gram after the 1200° F. calcination. A 486 gram pulverized portion of the base was mixed with 625 cc. of an aqueous ammoniacal solution containing 65.9 grams of ammonium molybdate, dried at 400° F., calcined for 3 hours at 1200° F., remixed and pilled. The chemical composition of this catalyst, on a water-free basis, approximated 39.6 parts of $TiO_2$, 50.4 parts of $Al_2O_3$ and 10 parts of $MoO_3$. The weight ratio 39.6 $TiO_2$ to 50.4 $Al_2O_3$ corresponds to 1 mole $TiO_2/1$ mole $Al_2O_3$.

The above described Example I is given in detail to show one method which gives good results. Other methods of preparation may be employed to give catalysts which also have the desired properties. The catalysts may, for example, be made by hydrolyzing the organic titanate and aluminum alcoholate mixture in ammoniacal water and aging the hydrous precipitate for 3-48 hours before drying. Also the titanate and alumina hydrous oxides may be prepared separately and then mixed in hydrous form before drying and calcination. It is understood that other organic titanates may be used in place of the butyl titanate. Other organic aluminum compounds such as the phenolates may also be used in place of the amylate. However, the preferred aluminum compounds are the alcohols, preferably, $C_5$ or higher alcohols. The hydrolysis may be carried out in the temperature range of 32-212° C., preferably, 32-80° F. Although good catalysts do not require aging of the hydrous oxide base, advantages may be obtained with some catalysts as far as stability is concerned if the hydrous oxides are aged before drying and calcination.

The molybdenum oxide may also be added to the alumina-titanate base by the "dry-mix" technique, in which a mixture of the pulverized base and pulverized molybdic acid anhydride are calcined; e.g. 3 hours at 1200° F. The molybdenum oxide containing catalysts can also be made by coprecipitation. The molybdenum content of the catalysts, as $MoO_3$, is in the range of 1-30 wt. percent, preferably, 5-20 wt. percent.

In another example, the alumina-titanate base is made by hydrolyzing the butyl titanate in a slurry of aluminum hydroxide and water.

In still another example, the butyl titanate is hydrolyzed in a slurry of $Al_2O_3$ in water, the composite being later calcined.

In another example, the butyl titanate is hydrolyzed in an aqueous solution of aluminum chloride to which ammonium hydroxide was then added to precipitate aluminum hydroxide.

Although the alumina-titania ratio may be varied from 95 mole percent alumina and 5% $TiO_2$ to 95% titania and 5% $Al_2O_3$, it was found that compositions in the range of 25-75% $Al_2O_3$ and 75-25% $TiO_2$ perform the best. For example, heating a 95 wt. percent $TiO_2$—5 wt. percent $Al_2O_3$ composition for 3 hours at 1200° F. gave a material with a surface area of only 120 square meters per gram, whereas, the catalyst base illustrated in Example I had a surface area of 245 square meters per gram after the 1200° F. calcination.

Active components, other than $MoO_3$, may be added to the alumina-titania base, as shown in the following example, where $Cr_2O_3$ and $K_2O$ are added to the base.

EXAMPLE II

To 300 grams of an $Al_2O_3$—$TiO_2$ base, made as in Example I, but containing 45 $Al_2O_3$—55 $TiO_2$, was added an aqueous solution cotaining 171 grams of $CrO_3$. The amount of water used in the solution was such that the solution was just sufficient to wet the base. After drying at 400° F. and calcining for 3 hours at 1100° F., another aqueous solution containing 18.5 grams of $KNO_3$ was added to just wet the catalyst. Upon drying at 400° F. and calcination at 1100° F. a catalyst was produced having the nominal composition of about 31 $Al_2O_3$—38 $TiO_2$—29 $Cr_2O_3$—2 $K_2O$. This catalyst is excellent for converting paraffins into aromatics; e.g., heptane to toluene at 0 p.s.i.g. and 1020° F., in the presence of 2000–8000 s.c.f. of $H_2$.

EXAMPLE III

In a third example, 0.6 weight percent platinum was added as a solution of chlorplatinic acid, dried and then calcined to give a very active and stable catalyst containing 99.4% (75 $Al_2O$—25 $TiO_2$)—0.6% $Pt^1$.

This catalyst shows the high hydrogenation-dehydrogenation activity characteristic of good platinum containing catalysts. The preparation from butyl titanate and aluminum alcoholate results in a base of high purity—a characteristic essential for the high stability desired for platinum type catalyst.

EXAMPLE IV

A catalyst prepared from butyl titanate, aluminum chloride, zinc nitrate by mulling together the hydrous oxides formed from these compounds had, after drying and impregnation with $MoO_3$—the nominal composition.

72 ($TiO_2.Al_2O_3$)—18 ZnO—10 $MoO_3$ [1]

where $TiO_2.Al_2O_3$ signifies equal molar amounts of $TiO_2$ and $Al_2O_3$. When tested under hydroforming conditions for the production of toluene from methylcyclohexane the catalyst produced 14% more aromatics in liquid product than did the standard 90 $Al_2O_3$—10 $MoO_3$[1] catalyst under the same standardized test conditions

|  | Percent Aromatics in Liquid |
|---|---|
| This invention (72 $TiO_2.Al_2O_3$)[1]—18 ZnO—10 $MoO_3$) | 84 |
| Standard Cat. (90 $Al_2O_3$—10 $MoO_3$)[1] | 70 |

[1] The foregoing ratios are in parts by weight.

Of course, it is well known that high surface area is in important attribute of hydroforming catalyst as is heat stability, since it is proposed that the present catalyst be used in a regenerative type of operation wherein the catalyst which has acquired carbonaceous and other deposits in use during hydroforming is regenerated in oxygen-containing gas at elevated temperatures. Therefore, in order to show the heat stability of the catalyst base containing alumina and titania in which an organic titanate is the source of titania, the following data are set fourth for catalysts prepared in accordance with our invention and similar catalysts prepared conventionally from titanium sulfate starting material.

Table I

| Base | Surface Area, $M_2/g$. after heating at— | | |
|---|---|---|---|
|  | 700° F. | 1,000° F. | 1,200° F. |
| From Organic Titanates: $TiO_2.Al_2O_3$ | 356 |  | 273 |
| Conventional Preparation: $TiO_2.Al_2O_3$ |  | 240 | 185 |

It is noted from the foregoing data that the base containing titania had a very high surface area, namely, 356 square meters per gram after being heated at 700° F., and after heating at 1200° F. for three hours, it had a surface area of 273 square meters per gram. This is to be compared with the conventional titania alumina composition, which after heating for three hours, at 1200° F., had a surface area of 185 square meters per gram, very much lower than that possessed by the base made by the present invention which underwent similar heat exposure.

In order further to show the novelty and the utility of the present class of catalysts, hydroforming tests were carried out, and in these tests, the new catalysts were compared with standard catalysts prepared by conventional methods. The same feed stock was used in these tests. It had an inspection which is set forth below:

Boiling range, ° F. _____ 200-330
Vol. percent naphthenes _____ 41
Vol. percent aromatics _____ 16
Vol. percent paraffins _____ 43
Research octane number _____ 58

This feed was hydroformed in each test under the following conditions:

Temperature, ° F. _____ 900
Pressure, p.s.i.g. _____ 200
Standard cubic feet of hydrogen per barrel of naphtha feed _____ 2,000

The results of these tests are set forth below:

Table II

| Nominal Catalyst Composition, Wt. Percent: |  |  |  |
|---|---|---|---|
| $TiO_2$ | 39.6 | 39.6 |  |
| $Al_2O_3$ | 50.4 | 50.4 | 90. |
| $MoO_3$ | 10 | 10 | 10. |
| Method of preparation | This invention. | Standard. | Standard (control). |
| Relative Activity: |  |  |  |
| Ratio of feed rates for 95 Research O.N. | 1.30 | 0.76 | 1.0. |
| Yield: |  |  |  |
| Vol. Percent $C_5$—430° F. Gasoline @ 95 O.N. | 81 | 77.5 | 79. |

These results show that the titania-alumina-molybdena catalyst prepared according to this present invention is more active than a catalyst of the same composition prepared according to the customary procedure. It is also more active than the commercial type alumina-molybdena catalyst. The gasoline yields obtained with the catalysts of this invention are higher than those obtained with the other catalysts.

With another catalyst prepared according to this invention, the yield of gasoline was considerably greater at 95 research octane number than for the standard alumina-molybdena catalysts. This is shown below:

Table III

| Catalyst | $C_5$+Gasoline at 95 O.N. Vol. Percent on Feed | Δ From Standard |
|---|---|---|
| 35 $TiO_2$—44.8 $Al_2O_3$—20 $MoO_3$ (This invention) | 81.2 | +2.2 |
| 90 $Al_2O_3$—10 $MoO_3$ (Standard cat.) | 79.0 | 0 |
| 80 $Al_2O_3$—20 $MoO_3$ (Control) | 79.0 | 0 |

To recapitulate briefly, the present invention relates to a new class of catalysts which contain titania, characterized in that the titania is derived from organic titanates. The improved activity of catalysts containing titania from this source is not explainable. Repeated tests, however, have established it as a fact. The new bases comprise titania admixed with alumina prepared, preferably, by the alcoholate method. In this alcoholate method metallic aluminum is reacted with an alcohol in the presence of mercury chloride to form an aluminum alcoholate. The butyl titanate and aluminum alcoholate may be hydrolyzed at the same time or the aluminum alcoholate may be hydrolyzed with aqueous $NH_3$ as disclosed in the application of Isidor Kirshenbaum et al., Serial No. 402,-473, filed January 6, 1954, now abandoned. In this application the hydrolysis is carried out using water containing a small amount of about 2½% of $NH_3$ and the aluminum alcoholate undergoing hydrolysis was permitted to stand for about five hours at 80° F. The trihydrate formed is dried at about 250° F. and the conversion to eta alumina was 100% upon calcination at elevated temperatures.

The hydrogenation-dehydrogenation component is then incorporated into this base, preferably, by impregnation of the base with a water soluble compound followed by decomposition in situ, usually by heating. Where platinum is to be incorporated into the base, the water soluble salt or compound may be decomposed with $H_2S$ followed by reduction with hydrogen. By a similar procedure; palladium may be incorporated into the base. The preferred method of impregnation with Pt, however, as disclosed in the aforesaid application of Isidor Kirshenbaum et al. involves, in brief compass, impregnating eta alumina with a water soluble salt. The gross amount of solution utilized is preferably that required to impregnate with the desired amount of platinum by just wetting the total alumina. The alumina support in the platinum solution is heated to dryness, conveniently at temperatures of about 100–600° F. at atmospheric pressure, which results in removal of a substantial portion of the water.

The final step in the preparation involves the subjection of the dried catalyst to a reduction step. This reducing step can be carried out by means known in the art, such as hydrogenation and treatment with chemical reducing agents. Typical of these reduction operations is treatment with hydrogen at 200°–1000° F. with hydrogenation pressures of atmospheric to 1000 pounds p.s.i.g. The catalyst can be calcined after the drying step. Calcining can be carried out at temperatures of the order of about 1100° F., e.g., 800°–1250° F. Both types of operations are preferably carried out slowly, for example, over the course of about 4 to 24 hours.

The amount of platinum present in these platinum supported catalysts should be from about 0.005 to 2 wt. percent based on the total weight of catalyst.

In the case of the Pt catalyst, the best results in hydroforming are obtained under the following conditions:

|  | Range | Preferred |
| --- | --- | --- |
| Temperature, °F | 800–1,050 | 850–970 |
| Pressure, p.s.i.g | 50–1,000 | 200–700 |
| Standard cubic feet $H_2$ fed to reaction zone per barrel of oil | 2,000–15,000 | 5,000–10,000 |

In the case where the hydrogenation-dehydrogenation component is chromium oxide conditions giving best results in hydroforming and/or aromatization are as follows:

|  | Range | Preferred |
| --- | --- | --- |
| Temperature, °F | 850–1,075 | 950–1,050 |
| Pressure, p.s.i.g | 0–300 | 0–150 |
| Standard cubic feet $H_2$ fed to reaction zone per barrel of oil | 0–15,000 | 2,000–8,000 |

Numerous modifications of the foregoing specific directions for preparing and using the new catalyst may be made without departing from the spirit of the present invention.

What is claimed is:

1. A method of preparing a hydroforming catalyst which comprises mixing butyl titanate with an aluminum alcoholate, hydrolyzing the mixture at room temperature during agitation, filtering the resulting slurry, drying, calcining and adding a hydrogenation-dehydrogenation component into the calcined material.

2. A method according to claim 1 in which the hydrogenation-dehydrogenation component comprises molybdena.

3. A method according to claim 1 in which the hydrogenation-dehydrogenation component comprises a mixture of chromia and potassium oxide.

4. A method according to claim 1 in which the hydrogenation-dehydrogenation component comprises platinum.

5. A method according to claim 1 in which the hydrogenation-dehydrogenation component contains between about 0.05–2 wt. percent platinum based on the total weight of the catalyst.

6. An improved hydroforming catalyst which comprises alumina, titania and a lesser amount of molybdena and in which the molar ratio of titania to alumina is about one and the catalyst is prepared by hydrolyzing a solution of butyl titanate and an aluminum alcoholate with water to produce a slurry of alumina and titania, separating alumina and titania from the slurry and drying and calcining the separated alumina and titania, then impregnating the calcined alumina and titania with ammonium molybdate and drying and calcining the impregnated alumina and titania.

7. An improved hydroforming catalyst as defined in claim 6 which contains about 39.6 weight percent titania, about 50.4 weight % alumina and about 10% molybdena.

8. A method of hydroforming naphthas which comprises contacting naphtha at an elevated temperature and pressure in the presence of added hydrogen and a catalyst prepared by hydrolyzing a solution of butyl titanate and an aluminum alcoholate with water to produce a slurry of alumina and titania, separating alumina and titania from the slurry and drying and calcining the separated alumina and titania, then impregnating the calcined alumina and titania with ammonium molybdate and drying and calcining the impregnated alumina and titania.

9. A hydroforming catalyst consisting of about 50.4% by weight of alumina, about 39.6% by weight of titania and about 10% by weight of molybdena and prepared by hydrolyzing a solution of butyl titanate and an aluminum alcoholate with water to produce a slurry of alumina and titania, separating alumina and titania from the slurry and drying the separated alumina and titania, then impregnating the dried alumina and titania with ammonium molybdate and drying and calcining the impregnated alumina and titania.

10. A hydroforming catalyst consisting of about 50.4% by weight of alumina, about 39.6% by weight of titania and the rest a hydrogenation-dehydrogenation component and prepared by hydrolyzing a solution of butyl titanate and an aluminum alcoholate with water to produce a slurry of alumina and titania, then impregnating the dried alumina and the titania with ammonium molybdate and drying and calcining the impregnated alumina and titania.

11. An improved hydroforming catalyst which contains alumina, titania and a lesser amount of molybdena and in which the molar ratio of titania to alumina is about one and the catalyst is prepared by hydrolyzing a solution of butyl titanate and an aluminum alcoholate to produce a slurry of alumina and titania, separating alumina and titania from the slurry and drying the separated alumina and titania, then impregnating the dried alumina and titania with ammonium molybdate and drying an calcining the impregnated alumina and titania.

12. A method of hydroforming naphthas which comprises contacting naphtha at an elevated temperature and pressure in the presence of added hydrogen and a catalyst prepared by hydrolyzing a solution of butyl titanate and an aluminum alcoholate to produce a slurry of alumina and titania, separating alumina and titania from the slurry and drying the separated alumina and titania, then impregnating the dried alumina and titania with ammonium molybdate and drying and calcining the impregnated alumina and titania.

13. A method according to claim 8 in which the alumina and titania are present in the ratio from about 25-75 wt. percent alumina to about 75-25 wt. percent titania.

14. A method according to claim 12 in which the alumina and titania are present in the ratio from about 25-75 wt. percent alumina to about 75-25 wt. percent titania.

15. A method of preparing a hydroforming catalyst which comprises mixing butyl titanate with an aluminum alcoholate, hydrolyzing the mixture at room temperature while agitating to form a slurry, filtering said slurry, drying, calcining and adding a hydrogenation-dehydrogenation component into the calcined material, the alumina and titania being present in the ratio from about 25-75 wt. percent alumina to about 75-25 wt. percent titania.

References Cited in the file of this patent

UNITED STATES PATENTS

| | | |
|---|---|---|
| 2,453,327 | Layng | Nov. 9, 1948 |
| 2,605,238 | Krantz | July 29, 1952 |
| 2,636,865 | Kimberlin | Apr. 28, 1953 |
| 2,748,062 | Doumani | May 29, 1956 |

OTHER REFERENCES

Bischoff, et al.: "Jour. Amer. Chem. Soc.," vol. 46 (1924), pages 256-259.

Bischoff, et al.: "Jour. Amer. Chem. Soc.," vol. 47 (1925), pages 807-826.